United States Patent [19]

Macholdt et al.

[11] Patent Number: 5,073,579

[45] Date of Patent: Dec. 17, 1991

[54] PROCESS FOR ENHANCING THE ELECTROSTATIC CHARGEABILITY OF POWDER COATINGS OF POWDERS, AND THE USE THEREOF FOR SURFACE-COATING SOLID OBJECTS

[75] Inventors: Hans-Tobias Macholdt, Darmstadt; Alexander Sieber, Frankfurt am Main; Claus Godau, Kiedrich; Albrecht Manz, Wiesbaden, all of Fed. Rep. of Germany

[73] Assignee: Hoechst Aktiengesellschaft, Frankfurt am Main, Fed. Rep. of Germany

[21] Appl. No.: 266,509

[22] Filed: Nov. 3, 1988

[30] Foreign Application Priority Data

Nov. 5, 1987 [DE] Fed. Rep. of Germany ....... 3737495

[51] Int. Cl.$^5$ ............................................... C08K 5/18
[52] U.S. Cl. ..................................... 524/255; 427/27; 427/30
[58] Field of Search .................. 524/159, 83, 89, 255; 427/27, 30

[56] References Cited

U.S. PATENT DOCUMENTS 3,669,922 6/1972 Bartsch et al. ...................... 524/89
4,908,225 3/1990 Niimura et al. ...................... 427/27

FOREIGN PATENT DOCUMENTS 3600395 8/1987 Fed. Rep. of Germany .

OTHER PUBLICATIONS

Haselmeyer et al., *Defazet*, 27, 529 (1973) ("Additive fuer EPS-Pulver").

*Primary Examiner*—Paul R. Michl
*Assistant Examiner*—Edward J. Cain
*Attorney, Agent, or Firm*—Connolly & Hutz

[57] ABSTRACT

Process for enhancing the electrostatic chargeability of powder coatings or powders, and the use thereof for surface-coating solid objects.

A process for enhancing the electrostatic chargeability of powder coatings or powders intended for surface-coating solid objects, by homogeneously incorporating at least one triarylmethane, azine, thazine and/or oxazine compound in an amount from about 0.01 to about 10 percent by weight into powder coatings or powders, the compounds mentioned being dissolved or dispersed in the powder coating system or powders.

5 Claims, No Drawings

PROCESS FOR ENHANCING THE ELECTROSTATIC CHARGEABILITY OF POWDER COATINGS OF POWDERS, AND THE USE THEREOF FOR SURFACE-COATING SOLID OBJECTS

DESCRIPTION

The present invention relates to a process for enhancing the electrostatic changeability of powder coatings or powders by homogeneously incorporating triarylmethane, azine, thiazine or oxazine compounds into the powder coatings or powders, and to the use of the powder coatings or powders treated in this manner for surface-coating solid objects (workpieces).

Powder coating technology is used, inter alia, in the coating of small objects, such as garden furniture, camping articles, household appliances, small automotive parts, refrigerators and shelves, and in the coating of workpieces with a complicated shape. For the most part, metallic objects are coated, but it is also possible, for example, to coat plastics using powder coating technology. Compared with other coating methods, such as brushing, dipping and conventional spraying, powder coating technology has a number of advantages. For example, the coating method does not involve solvents and is thus environmentally friendly and less expensive.

The method is also advantageous with regard to disposal, industrial safety (absence of combustible solvents), industrial hygiene, environmental protection and the time taken for a coating operation.

Powder coating technology is based on the principle of electrostatic charging. The powder coating or powder generally receives its electrostatic charge by one of the two following methods:

a) In the corona method, the powder coating or the powder is routed past a charged corona and charged.

b) In the triboelectric or electrokinetic method, use is made of the principle of frictional electricity. In a spray gun, the powder coating or the powder is given an electrostatic charge which is opposite to the charge of the frictional partner, generally a tube or spray pipe (for example made of polytetrafluoroethylene).

It is also possible to combine the two methods.

Powder coating resins employed are typically epoxy resins, carboxyl- and hydroxyl-containing polyester resins and acrylic resins, together with the appropriate curing agents. Combinations of resins are also used. Thus, for example, epoxy resins are frequently employed in combination with carboxyl- and hydroxyl-containing polyester resins.

Typical curing components for epoxy resins are, for example acid anhydrides, imidazoles and dicyandiamide and derivatives thereof. The curing components for hydroxylcontaining polyester resins are typically, for example, acid anhydrides, blocked isocyanates, bisacylurethanes, phenolic resins and melamine resins, and curing components for carboxyl-containing polyester resins are typically, for example, triglycidyl isocyanurates or epoxy resins. The curing components used in acrylic resins are typically, for example, oxazolines, isocyanates, triglyicidyl isocyanurates or dicarboxylic acids.

The method of charging the powder coatings or powders by frictional electricity has a number of advantages over the corona charging method. Thus, for example, the cost of producing and insulating the high voltage for operating the corona is superfluous, which increases, for example, the operational safety, in particular during hand operation. In addition, it results in the spray guns becoming lighter, which is again important, above all, for hand spray guns.

Furthermore, powder paints which are electrostatically charged by means of friction have a more uniform charge and have less tendency towards back-spraying. ("Backspraying" is taken to mean the effect whereby powder coating particles already adhering to the sprayed workpiece detach themselves from the latter again and spray off in all directions). In addition, the spray lances of the application equipment, which operate on the principle of frictional charging, can be extended by several meters without difficulties, moved closer to the article to be sprayed and thus also introduced into pipes or cavities.

In contrast, it is frequently a problem in powder coatings sprayed by the frictional charge method that the powder particles are insufficiently charged and produce poor throwing power on the sprayed workpiece. (The term "throwing power" is a measure of the extent to which a powder coating is also deposited on the rear, in cavities, in cracks and above all in the spraying shadow and on internal edges and in internal corners).

The problem of inadequate charging is observed, in particular, in powder coatings which have been prepared on the basis of polyester resins, in particular carboxylcontaining polyesters, or on the basis of so-called mixed powders. Mixed powders are taken to mean powder coatings whose resin base comprises a combination of an epoxy resin and a carboxyl-containing polyester resin. The mixed powders form the basis for the powder coatings most frequently encountered in practice.

Whereas powder coatings on a pure epoxy resin basis can still be triboelectrically sprayed relatively well, the method (triboelectric spraying) is generally unsatisfactory when mixed powders or powder coatings based on polyester resins are used. This means that the choice of resins for triboelectrically sprayed powder coatings is greatly limited. This is very unsatisfactory inasmuch as it is precisely by means of the resin base that a very wide variety of properties of a powder coating can be adjusted. For this reason, it is at present not possible to satisfy all applicational demands in all cases using triboelectrically sprayed powder coatings, which explains the fact that this advantageous method is still not very widespread.

There was therefore a demand for providing powder coatings or powders based on a very wide variety of resins, in particular triboelectrically sprayable powder coatings, with a higher and more uniform charge, and to achieve the highest and most uniform deposition rate possible on spraying the workpiece, the other properties of the powder coating, such as the mechanical properties and processability, being impaired as little as possible.

A known process for improving the electrostatic charging of triboelectrically sprayable powder coatings comprises adding aluminum oxide (F. Haselmeyer, K. Oehmichen, DEFAZET, Vol. 27, No. 11, 1973, page 529). In this procedure, the aluminum oxide is added to the finished powder coating before spraying, typically in concentrations between 1 and 5 %. In this case, however, the material mentioned is not incorporated homogeneously into the powder coating, which results in difficulties, in particular, during continuous procedures.

If, on the other hand, the aluminum oxide is homogeneously incorporated (dispersed) into the powder coatings, it imparts its charge-increasing effect. The difficulties on adding aluminum oxide, for example, are that, in practice, the improvement in the electrostatic charge is only temporary. In addition, there are problems in mixing the powder coating and the additive uniformly, with separation of the powder coating and the additive and with abrasion in the charging zone.

A further attempt to improve the charging of triboelectrically sprayable powder coatings is described in German Offenlegungsschrift 3,600,395 A1. In this Offenlegungsschrift, the problem, known per se, of poor chargeability of triboelectrically sprayable powder coatings is likewise pointed out and, as a possible solution, the addition of capillary-active wetting agents based on quaternary ammonium compounds or the addition of, for example, metalcontaining pigments, preferably zinc dust, is postulated only in a general manner.

Surprisingly, it has now been found that specific triarylmethane, azine, thiazine or oxazine compounds enhance the electrostatic chargeability of powder coatings and powders, in particular of triboelectrically sprayed powder coatings, if they are homogeneously incorporated. The higher electrostatic charging that this causes has, as a further positive effect, more uniform deposition of the sprayed powder coating or powder onto the coated object (workpiece) as a result.

The present invention therefore relates to a process for enhancing the electrostatic chargeability of powder coatings or powders intended for surface-coating solid objects (workpieces) by homogeneously incorporating at least one triarylmethane, azine, thiazine and/or oxazine compound into the powder coatings or powders, where, in the case of the triarylmethane compounds, those are particularly suitable which are substituted on the aromatic ring by primary or secondary amino groups, $(C_1-C_4)$alkyl groups or halogen atoms, preferably chlorine atoms or whose central carbon atom is trivalent, such as, for example, Colour Index Pigment Blue 1, 1:2, 2, 3, 8, 9, 9:1, 10, 10:1, 11, 12, 14, 18, 19, 24, 53, 56, 57, 58, 59, 61, 62 or 67, or, for example, Colour Index Solvent Blue 2, 3, 4, 5, 6, 23, 43, 54, 66, 71, 72, 81, 124 or 125, and the triarylmethane compounds listed in the Colour Index under Acid Blue and Basic Dye, so long as they are suitable with respect to their temperature stability and processability, such as, for example, Colour Index Basic Blue 1, 2, 5, 7, 8 , 11, 15, 18, 20, 23, 26, 36, 55, 56, 77, 81, 83, 88 or 89, Colour Index Basic Green 1, 3, 4, 9 or 10, and where, in turn, Colour Index Solvent Blue 125, Solvent Blue 66 and Solvent Blue 124 are very particularly suitable, Solvent Blue 124 being very particularly suitable in its form as a highly-crystalline sulfate salt, and trichlorotriphenylmethyl tetrachloroaluminate, and the triarylmethane compounds furthermore listed in the examples in German Patent 1,919,724 corresponding to U.S. Pat. No. 3,652,602 and German Patent 1,644,619, corresponding to U.S. Pat. No. 3,671,553 and where, in the case of the azine, thiazine or oxazine compounds, Colour Index Solvent Black 5, 5:1, 5:2, 7, 31 or 50, Colour Index Pigment Black 1, Colour Index Oxidation Base 1, Colour Index Basic Red 2 or Colour Index Basic Black 1 or 2 are particularly suitable from the class comprising the azines, Colour Index Basic Blue 9, 24 or 25 and Solvent Blue 8 from the class comprising the thiazines, and Colour Index Pigment Violet 23 or Colour Index Basic Blue 3, 10 or 12 from the class comprising the oxazines, and also the azines, thazines and oxazines listed in the Colour Index under Basic Dye and/or Acid Dye, so long as they are suitable with respect to their temperature stability and processability, in an amount from about 0.01 to about 10% by weight, preferably 0.1to about 5% by weight, and to the use of the powder coatings or powders treated in this way for surface-coating solid objects (workpieces) made of metal, wood, plastic, glass, ceramic, concrete, textile material, paper or rubber.

The formulae and identifications corresponding to the above-noted pigments and dyes are stated below:

| | | |
|---|---|---|
| Color Index Pigment B1 | triphenylmethane (PTMA salt of basic dye) | Bright Reddish Blue |
| Color Index Pigment B1:2 | silcomolybdic (acid salts of basic dye) | |
| Color Index Pigment B2 | triphenylmethane (PTMA salt of basic dye) | Bright Blue |
| Color Index Pigment B3 | triphenylmethane (PTMA salt of basic dye) | Bright Blue |
| Color Index Pigment B8 | PTMA salt of mixed basic dyes | Bright Greenish Blue |
| Color Index Pigment B9 | triphenylmethane PTMA salt of basic dye | Bright Greenish Blue |
| Color Index Pigment B9:1 | triphenylmethane (PTMA salt of basic dye) | Bright Reddish Blue |
| Color Index Pigment B10 | triphenylmethane (PTMA salt of basic dye) | Bright Reddish Blue |
| Color Index Pigment B10:1 | triphenylmethane (PTMA salt of basic dye) | Bright Reddish Blue |
| Color Index Pigment B11 | triphenylmethane (PTA salt of basic dye) | Reddish Blue |
| Color Index Pigment B12 | triphenylmethane (PTA salt of basic dye) | Bright Blue |
| Color Index Pigment B14 | triphenylmethane (PMA or PTA salts of basic dye) | Bright Reddish Blue |
| Color Index Pigment B18 | triarylmethane (Pigment) | Bright Blue Bright Reddish Navy |
| Color Index Pigment B19 | triarylmethane (Pigment) Navy | Bright Blue Bright Reddish |
| Color Index Pigment B24 | triphenylmethane (barium salt of acid dye) | Bright Greenish Blue |
| Color Index Pigment B53 | triarylmethane (PTMA salt of basic dye) | Blue-Greenish Blue |
| Color Index Pigment B56 | triarylmethane | Greenish |
| Color Index Pigment B52 | triarylmethane | Reddish Blue |
| Color Index Pigment B58 | triphenylmethane | Reddish Blue |
| Color Index Pigment B59 | triphenylmethane | Blue |
| Color Index Pigment B61 | triphenylmethane (pigment) | " |
| Color Index Pigment B62 | triphenylmethane (pigment) | Reddish Blue-Blue |
| Color Index Pigment B67 | triarylmethane | Reddish Blue |

PTMA represents phosphotungstonolybdic acid; PTA represents phosphotungsic acid; PMA represents phosphomotybdic acid.

| | | |
|---|---|---|
| Color Index Solvent B2 | triarylmethane | Bright Reddish Blue (NC lacquer) |
| Color Index Solvent B3 | " | Blue |
| Color Index Solvent B4 | " | Bright Blue |
| Color Index Solvent B5 | " | Bright Blue (NC lacquer) |
| Color Index Solvent B6 | " | Dull Blue (NC lacquer) |
| Color Index Solvent B8 | thiazine | Greenish Gray |
| Color Index Solvent B23 | triarylmethane | Greenish Blue |
| Color Index Solvent B43 | triphenylmethane | Bright Reddish Blue |
| Color Index Solvent B54 | triarylmethane | Bright Reddish Blue |
| Color Index Solvent B66 | triphenylmethane | Bright Blue |
| Color Index Solvent B71 | triphenylmethane | Blue |
| Color Index Solvent B72 | " | Reddish Blue |
| Color Index Solvent B81 | triarylmethane | Greenish Blue |
| Color Index Solvent B124 | triarylmethane | Bright Blue |
| Color Index Solvent B125 | triarylmethane | Bright Greenish Blue |

Color Index Acid Blue 9          Bright Greenish Blue

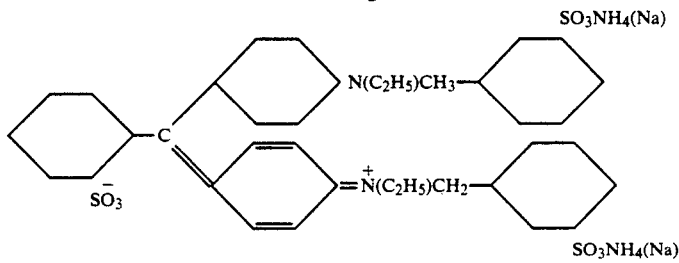

Color Index Basic Blue 1         Bright Bluish Green-
                                  Bright Greenish Blue

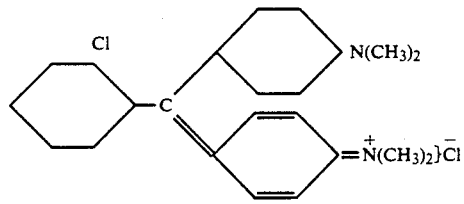

Color Index Basic Blue 8         Reddish Blue

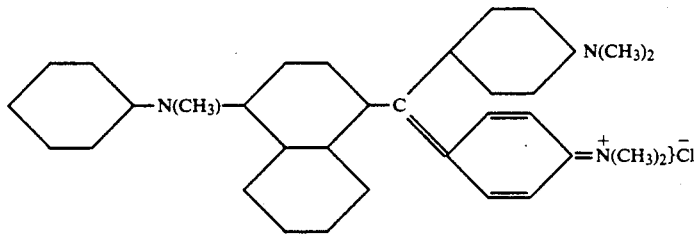

Color Index Basic Blue 7         Bright Reddish Blue

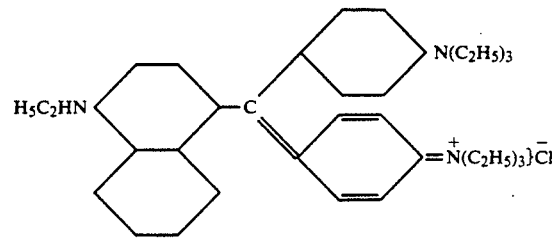

Color Index Basic Blue 11        Bright Reddish Blue

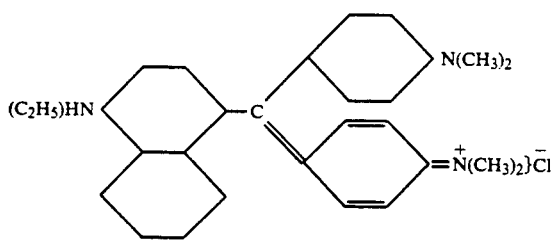
Color Index Basic Blue 26  Bright Blue
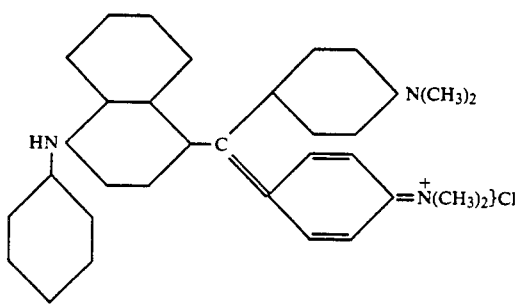
Color Index Acid Blue 119  Blue
Carbinol base  Blue dye
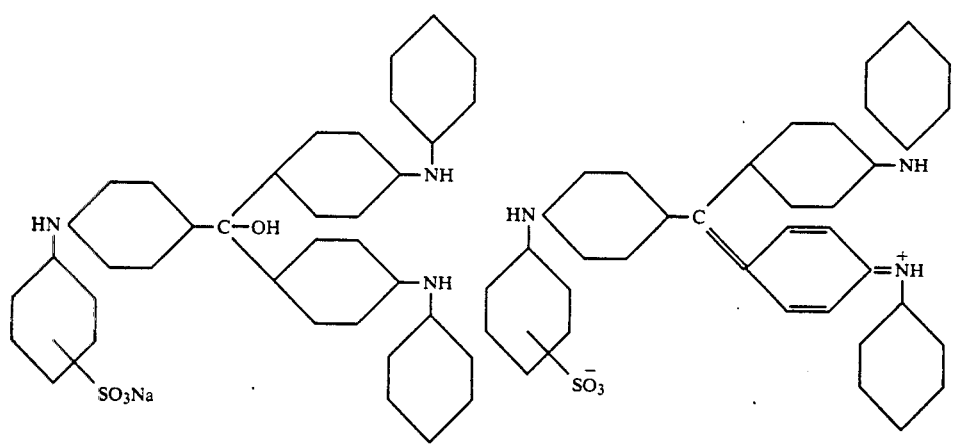
Color Index Acid Blue 48  Blue
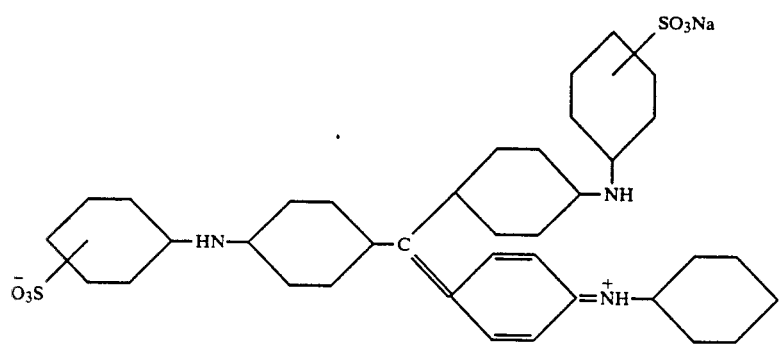
Color Index Basic Blue 5  Bright Blue

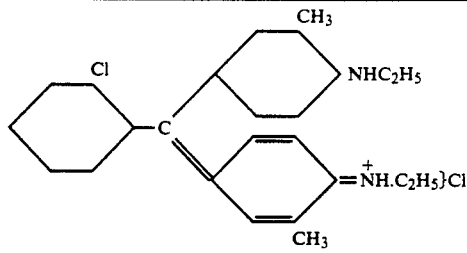

Color Index Basic Blue 9    Bright Greenish Blue

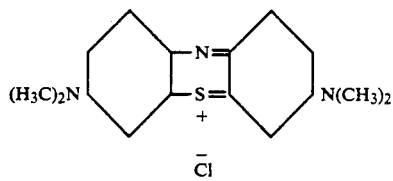

Color Index Pigment Violet 23    Bluish Violet

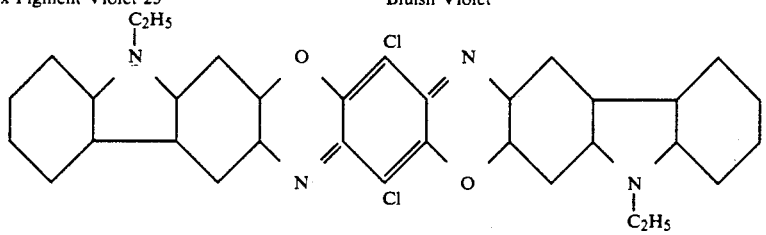

| Color Index Basic B2 | triarylmethane | |
| Color Index Basic B3 | oxazine | Bright Greenish Blue |
| Color Index Basic B10 | oxazine | Navy |
| Color Index Basic B12 | " | Bright Blue |
| Color Index Basic B15 | triarylmethane | Blue |
| Color Index Basic Green1 | triarylmethane | Bright Green |
| Color Index Basic Green3 | " | Bright Bluish Green |
| Color Index Basic Green4 | " | " |
| Color Index Basic Green9 | " | Yellowish Green |
| Color Index Basic Green10 | " | Bluish Green |
| Color Index Basic B24 | Thiazine | Bright Blue |
| Color Index Basic B25 | " | Dull Greenish Blue |
| Color Index Solvent Black5 | Nigosine Spirit Soluble | Bluish Black |
| Color Index Solvent Black 5:1 | Nigosine Spirit Soluble | Black |
| Color Index Solvent Black 5:2 | Nigosine Spirit Soluble | " |
| Color Index Solvent Black7 | Nigosine Spirit Soluble | Black |
| Color Index Solvent Black31 | polyazine | |
| Color Index Solvent Black50 | azine | Bluish Black |
| Color Index Pigment Black1 | azine (pigment) | Black |
| Color Index Basic Red2 | azine | Bright Bluish Pink |
| Color Index Basic Black1 | " | Grey |
| Color Index Basic Black2 | monaza | Bluish Grey to Black |

The compounds used according to the invention may be in dissolved or dispersed form in the powder coating or powder. Incorporation can take place in a manner known per se, for example by mixing and extruding or kneading the salt-like compound into the basic resin, for example polyester resin. The compounds employed according to the invention can be added as a dried and ground powder, as a dispersion or as a masterbatch, or in another suitable form or in solution. In principle, it is also possible to add the compound as early as during preparation of the particular powder (coating) resins, i.e. during the polymerization or polycondensation thereof. An advantage of the compounds employed according to the invention is that incorporation takes place without specifically developed powder recipes being necessary to this end, which would again limit the general applieability of the compounds mentioned; incorporation of the compounds comprises merely adding them during the operation selected for this purpose during powder (coating) production; an additional process step is not necessary.

The advantage of having the compounds according to the invention in dissolved or dispersed form in the powder coating or powder is that all the powder particles have enhanced electrostatic chargeability to the same extent, i.e. non-uniform effects cannot occur. Non-uniform effects due to the addition rates, inadequate mixing or due to separation are equally excluded.

The compounds used according to the invention can be employed in pigmented or non-pigmented (clear coating), colored or non-colored powder coatings or powder coating systems. Due to their generally intense inherent color, the compounds employed according to the invention are in this case preferably suitable for colored powder coatings or powders, either alone or in combination with other colorants.

Since addition of the compounds employed according to the invention to enhance the chargeability and to improve the throwing power and deposition rate must, on the other hand, impair the other mechanical properties and the processability as little as possible, i.e. the amount added should be as low as possible, it is of great advantage that the compounds used according to the invention are highly active products which represent a specific selection from the large classes comprising the triarylmethane, azine, thiazine and oxazine compounds.

The powder coatings or powders containing the compounds employed according to the invention can be employed for coating, for example, metal, plastic, wood, ceramic, concrete, glass, textiles or paper.

It is of very particular advantage that the use of the compounds employed according to the invention in the powder coatings or powders, in particular in triboelectrically sprayable powder coatings, makes a relatively large choice of resins possible and opens up novel resin systems. Whereas essentially only powder coatings on a pure epoxy resin basis could hitherto be triboelectrically sprayed satisfactorily, it is now also possible to fall back on other resin systems. In particular, it is now possible to triboelectrically apply powder coatings based on polyester resins by using the compounds used according to the invention.

A further advantage of the use of the compounds of the substance classes mentioned is the increased deposition rate of the powder coatings. This makes shorter spraying times possible, which is favorable in many regards, for example reduces costs. In combination with the enhanced chargeability and the improved throwing power, it is possible to achieve not only increased deposition of the sprayed powder coating on large areas, but also uniform coating in cavities, internal edges and corners and on the rear of the objects. The sprayed objects (workpieces) can thus be coated more uniformly.

The powder coatings mentioned in the examples below are produced by extrusion and are comparable with one another with regard to the production process and the particle size distribution (mean particle size 50 $\mu$m). Tribospraying of the powders or powder coatings was carried out using the "Tribo Star" spray gun from Messrs. Intec (Dortmund) using a standard spraying pipe and star-shaped internal rod, at maximum powder throughput at a spraying pressure of 3 bar. The object to be sprayed, a multiedged metal cube (size about 5×5×5 cm) was suspended in a spraying cabin and sprayed from a distance of 20 cm directly from the front without further movement of the spray gun. The charge of the sprayed powder in each case was measured using a "measuring instrument for measuring the triboelectric charge of powders" from Messrs. Intec (Dortmund). To carry out the measurements, the measurement antenna of the measuring instrument is held directly in the cloud of powder emerging from the spray gun. The current strength arising from the electrostatic charge of the powder coating or powder is indicated in $\mu$A. The throwing power and covering power were assessed visually. In particular, the extent to which rears, cavities, internal edges and corners and recesses behind edges were covered uniformly with surface coating was observed. Visual assessment is indicated in accordance with the DIN 53 230 evaluation scale 2.1 using scores from 0 to 5. On this scale, 0 is the best possible assessment and 5 the worst possible.

The examples below serve to illustrate the invention without representing a limitation. The parts indicated denote parts by weight.

EXAMPLE 1 (COMPARATIVE EXAMPLE)

A powder coating of the composition

| ®Alftalat AN 721 | (carboxyl-containing polyester from HOECHST AG) | 399 parts |
| --- | --- | --- |
| ®Beckopox EP 303 | (epoxy resin type 3 from HOECHST AG) | 171 parts |
| ®Kronos 2160 | (titanium dioxide from Kronos Titan GmbH) | 295 parts |
| Blanc Fixe F | (barium sulfate from Sachtleben Chemie GmbH) | 100 parts |
| ®Additol XL 496 | (flow-control agent from HOECHST AG) | 30 parts |
| Benzoin | | 5 parts |
| | | 1,000 parts | experiences an electrostatic charge corresponding to a current strength of 0.9 to 1.2 $\mu$A when sprayed triboelectrically using a star-shaped internal rod of length 38 cm.

Visual assessment of the sprayed workpiece (spraying duration 5 seconds) gave the score 4; the amount of powder deposited after 5 seconds was 1.4 g.

When a star-shaped internal rod of length 15 cm is used, the powder coating experiences a charge corresponding to a current strength of 0.3 to 0.4 $\mu$A when sprayed triboelectrically.

EXAMPLE 2

0.5 percent by weight of Colour Index Solvent Blue 124 in its highly-crystalline form is incorporated homogeneously into a powder coating of the composition described in Example 1. (The preparation of this compound is described in German Patent 1,919,724; in the X-ray diffraction diagram, the compound is characterized by a strong band at 2 theta degrees (CuK$_\alpha$) 18.47, three medium-strength bands at 2 theta degrees (CuK$_\alpha$) 5.97; 12.01 and 13.90; and weak, broad bands at two theta degrees (CuK$_\alpha$) 20.0; 21.7; 22.5; 24.8; 28.2; 30.7 and 32.2).

When sprayed triboelectrically using a star-shaped internal rod of length 38 cm, an electrostatic charge corresponding to a current strength of 1.8 to 1.9 $\mu$A is achieved.

Visual assessment of the sprayed workpiece (spraying duration 5 seconds) gave the score 3. The amount of powder deposited after 5 seconds was 1.5 g.

When a star-shaped internal rod of length 15 cm is used, the powder coating experiences a charge corresponding to a current strength of 0.4 $\mu$A when sprayed triboelectrically.

EXAMPLE 3

A powder coating of the composition described in Example 2, but containing 1 percent by weight, in place of 0.5 percent by weight, of the compound mentioned therein experiences an electrostatic charge corresponding to a current strength of 2.4 to 2.5 $\mu$A when sprayed triboelectrically using a star-shaped internal rod of length 38 cm.

Visual assessment of the sprayed workpiece (spraying duration 5 seconds) gave the score 2. The amount of powder deposited after 5 seconds was 1.6 g.

When a star-shaped internal rod of length 15 cm is used, the powder coating experiences a charge corresponding to a current strength of 0.8 to 0.9 μA when sprayed triboelectrically.

EXAMPLE 4

A powder coating of the composition described in Example 2, but containing 2 percent by weight, in place of 0.5 percent by weight, of the compound mentioned therein experiences an electrostatic charge corresponding to a current strength of 2.7 to 2.8 μA when sprayed triboelectrically using a star-shaped internal rod of length 38 cm.

Visual assessment of the sprayed workpiece (spraying duration 5 seconds) gave the score 1. The amount of powder deposited after 5 seconds was 1.6 g.

When a star-shaped internal rod of length 15 cm is used, the powder coating experiences a charge corresponding to a current strength of 1.0 to 1.1 μA when sprayed triboelectrically.

EXAMPLE 5

0.5 percent by weight of 4,4',4''-trichlorotriphenyl tetrachloroaluminate is homogeneously incorporated into a powder coating of the composition described in Example 1. (The preparation of this compound is described in German Patent 1,644,619).

When sprayed triboelectrically using a star-shaped internal rod of length 38 cm, an electrostatic charge corresponding to a current strength of 2.1 to 2.3 μA is achieved.

Visual assessment of the sprayed workpiece (spraying duration 5 seconds) gave the score 2. The amount of powder deposited after 5 seconds was 1.8 g.

EXAMPLE 6

A powder coating of the composition described in Example 5, but containing 1 percent by weight, in place of 0.5 percent by weight, of the compound mentioned therein experiences an electrostatic charge corresponding to a current strength of 2.4 to 2.5 μA when sprayed triboelectrically using a star-shaped internal rod of length 38 cm.

Visual assessment of the sprayed workpiece (spraying duration 5 seconds) gave the score 2. The amount of powder deposited after 5 seconds was 1.9 g.

EXAMPLE 7 (COMPARATIVE EXAMPLE)

A powder comprising pure styrene-methacrylic copolymer (®Dialec S 309 from messrs. Diamond Shamrock) experiences an electrostatic charge corresponding to a current strength of ±0 μA when sprayed triboelectrically both using a star-shaped internal rod of length 38 cm and using a star-shaped internal rod of length 15 cm.

EXAMPLE 8

1 percent by weight of the compound mentioned in Example 2 is homogeneously incorporated into a powder of the composition described in Example 7. When sprayed triboelectrically using a star-shaped internal rod of length 38 cm, an electrostatic charge corresponding to a current strength of 0.9 to 1.1 μA is achieved.

When a star-shaped internal rod of length 15 cm is used, the powder experiences a charge corresponding to a current strength of 0.3 to 0.5 μA when sprayed triboelectrically.

EXAMPLE 9

5 percent by weight of the compound mentioned in Example 2 are incorporated homogeneously into a powder of the composition described in Example 7. When sprayed triboelectrically using a star-shaped internal rod of length 38 cm, an electrostatic charge corresponding to a current strength of 2.8 to 3.0 μA is achieved.

When a star-shaped internal rod of length 15 cm is used, the powder experiences a charge corresponding to a current strength of 1.2 to 1.5 μA when sprayed triboelectrically.

EXAMPLE 10

1 percent by weight of the compound mentioned in Example 5 is incorporated into a powder of the composition described in Example 7. When sprayed triboelectrically using a star-shaped internal rod of length 38 cm, an electrostatic charge corresponding to a current strength of 0.9 to 1.1 μA is achieved.

When a star-shaped internal rod of length 15 cm is used, the powder experiences a charge corresponding to a current strength of 0.3 to 0.5 μA when sprayed triboelectrically.

EXAMPLE 11

1 percent by weight of Colour Index Solvent Blue 125 is incorporated homogeneously into a powder as described in Example 7.

When sprayed triboelectrically using a star-shaped internal rod of length 38 cm, the powder experiences a charge corresponding to a current strength of 0.9 to 1.0 μA.

When a star-shaped internal rod of length 15 cm is used, the powder experience$ a charge corresponding to a current strength of 0.5 to 0.6 μA when sprayed triboelectrically.

EXAMPLE 12

1 percent by weight of Colour Index Pigment Blue 61 (Colour Index Acid Blue 61) is incorporated homogeneously into a powder as described in Example 7.

When sprayed triboelectrically using a star-shaped internal rod of length 38 cm, the powder experiences a charge corresponding to a current strength of 0.5 to 0.6 μA.

When a star-shaped internal rod of length 15 cm is used, the powder experiences a charge corresponding to a current strength of 0.2 to 0.3 μA when sprayed triboelectrically.

EXAMPLE 13

1 percent by weight of Colour Index Acid Blue 93 is incorporated homogeneously into a powder as described in Example 7.

When sprayed triboelectrically using a star-shaped internal rod of length 38 cm, the powder experiences a charge corresponding to a current strength of 0.3 to 0.5 μA.

When a star-shaped internal rod of length 15 cm is used, the powder experiences a charge corresponding to a current strength of 0.1 μA when sprayed triboelectrically.

EXAMPLE 14

1 percent by weight of Colour Index Solvent Black 7 is incorporated homogeneously into a powder of the composition described in Example 7.

When sprayed triboelectrically using a star-shaped internal rod of length 38 cm, an electrostatic charge corresponding to a current strength of 4.6 to 4.8 μA is achieved.

When a star-shaped internal rod of length 15 cm is used, the powder experiences a charge corresponding to a current strength of 2.7 to 2.9 μA when sprayed triboelectrically.

EXAMPLE 15

1 percent by weight of Colour Index Solvent Black 5 is incorporated homogeneously into a powder of the composition described in Example 7.

When sprayed triboelectrically, an electrostatic charge corresponding to a current strength of 3.9 to 4.1 μA is achieved when a star-shaped internal rod of length 38 cm is used.

When a star-shaped internal rod of length 15 cm is used, the powder experiences a charge corresponding to a current strength of 3.0 to 3.2 μA when sprayed triboelectrically.

EXAMPLE 16

5 percent by weight of Colour Index Pigment Violet 23 are incorporated homogeneously into a powder of the composition described in Example 7.

When sprayed triboelectrically using a star-shaped internal rod of length 38 cm, the powder experiences a charge corresponding to a current strength of 2.1 to 2.3 μA.

When a star-shaped internal rod of length 15 cm is used, the powder experiences a triboelectric charge corresponding to a current strength of 1.3 to 1.4 μA.

We claim:

1. A triboelectrically sprayable powder coating consisting essentially of a resin powder selected from the group consisting of epoxy resin, carboxyl-containing resin, hydroxyl-containing resin and acrylic resin having homogeneously distributed therein about 0.01 to 10 percent by weight of the powder at least one triarylmethane compound selected from the group consisting of Colour Index Pigment Blue 1, 1:2, 2, 3, 8, 9, 9:1, 10, 10:1, 11, 12, 14, 18, 19, 24, 53, 56, 57, 58, 59, 61, 62 or 67, Colour Index solvent Blue 2, 3, 4, 5, 6, 23, 43, 54, 66, 71, 72, 81, 124 or 125, Colour Index Basic Blue 1, 2, 5, 7, 8, 11, 15, 18, 20, 23, 26, 36, 55, 56, 77, 81, 83, 88 or 89, and Colour Index Basic Green 1, 3, 4, 9 or 10.

2. A process for enhancing the electrostatic chargeability of triboelectrically sprayable powder coatings for surface-coating solid objects, which comprises homogeneously incorporating at least one triarylmethane compound selected from the group consisting of Colour Index Pigment Blue 1, 1:2, 2, 3, 8, 9, 9:1, 10, 10:1, 11, 12, 14, 18, 19, 24, 53, 56, 57, 58, Colour Index Solvent Blue 2, 3, 4, 5, 6, 23, 43, 54, 66, 71, 72, 81, 124 or 125, Colour Index Basic Blue 1, 2, 5, 7, 8, 11, 15, 18, 20, 23, 26, 36, 55, 56, 77, 81, 83, 88 or 89, and Colour Index Basic Green 1, 3, 4, 9 or 10 in an amount of from about 0.01 to about 10 percent by weight of powder coatings, said compound being dissolved or dispersed in a powder coating system.

3. The process as claimed in claim 2, wherein the compounds mentioned in claim 2 are homogeneously incorporated into the powder coatings or powders in an amount from about 0.1 to about 5 percent by weight.

4. The process as claimed in claim 2, wherein the powder coatings into which the compounds mentioned in claim 2 are homogeneously incorporated are based on epoxy resins, hydroxyl- and carboxyl-containing polyester resins or acrylic resins, or combinations thereof.

5. The process as claimed in claim 2, wherein the compounds mentioned in claim 2 are homogeneously incorporated in the form of a dry and ground powder or in the form of dispersion, a masterbatch or a solution into the powder coatings or powders.

* * * * *